(12) United States Patent
Nishikawa

(10) Patent No.: US 7,861,012 B2
(45) Date of Patent: Dec. 28, 2010

(54) DATA TRANSMITTING DEVICE AND DATA TRANSMITTING METHOD

(75) Inventor: Tomoki Nishikawa, Wakayama (JP)

(73) Assignee: Panasonic Corporation, Osaka (JP)

( * ) Notice: Subject to any disclaimer, the term of this patent is extended or adjusted under 35 U.S.C. 154(b) by 268 days.

(21) Appl. No.: 12/159,155

(22) PCT Filed: Aug. 31, 2006

(86) PCT No.: PCT/JP2006/317239

§ 371 (c)(1),
(2), (4) Date: Jun. 25, 2008

(87) PCT Pub. No.: WO2007/099659

PCT Pub. Date: Sep. 7, 2007

(65) Prior Publication Data

US 2010/0042754 A1    Feb. 18, 2010

(30) Foreign Application Priority Data

Mar. 1, 2006    (JP) .............................. 2006-054733

(51) Int. Cl.
*G06F 13/28* (2006.01)
*G06F 3/00* (2006.01)
(52) U.S. Cl. ............................. 710/22; 710/14; 710/23; 710/27; 710/28; 710/36; 710/52

(58) Field of Classification Search ....................... None
See application file for complete search history.

(56) References Cited

U.S. PATENT DOCUMENTS 6,185,634 B1 *    2/2001    Wilcox ........................ 710/26

FOREIGN PATENT DOCUMENTS

| JP | 7-297855 | 11/1995 |
|----|----------|---------|
| JP | 9-275381 | 10/1997 |
| JP | 11-355683 | 12/1999 |
| JP | 2001-69106 | 3/2001 |
| JP | 2001-306488 | 11/2001 |
| JP | 2002-366507 | 12/2002 |
| JP | 2004-252693 | 9/2004 |
| JP | 2004-287654 | 10/2004 |
| JP | 2005-85079 | 3/2005 |

* cited by examiner

*Primary Examiner*—Alan Chen
(74) *Attorney, Agent, or Firm*—McDermott Will & Emery LLP (57) ABSTRACT

A data transfer device includes: a plurality of storage devices (10) including a plurality of transfer sources (TS) of which storage regions are different from each other and setting registers (40) of which number is equal to the number of the transfer sources (TS). The setting registers (40) stores for the transfer sources (TS) DMA transfer settings of the transfer sources (TS), and a DMA control section (20) performs data transfer control on the basis of the set values of the setting registers (40).

20 Claims, 11 Drawing Sheets

DATA TRANSMITTING DEVICE AND DATA TRANSMITTING METHOD

RELATED APPLICATIONS

This application is the U.S. National Phase under 35 U.S.C. §371 of International Application No. PCT/JP 2006/317239, filed on Aug. 31, 2006, which in turn claims the benefit of Japanese Application No. 2006-054733, filed on Mar. 1, 2006, the disclosures of which Applications are incorporated by reference herein.

Technical Field

The present invention relates to a data transfer device and a data transfer method in an audio visual (AV) data recording/replaying device.

Background art

AV data is received through digital TV (DTV) broadcasting and is recoded in a medium, such as a DVD, a Blu-ray disc (BD), or the like.

Received data undergone pre-processing in a system LSI for DTV is set in the form of a transport stream (TS). A DTV system is one of MPEG-2 systems. In MPEG-2, there are, as data series in addition to TS, a program stream (PS) used in DVDs and a packetized elementary stream (PES) ranked as intermediate data in conversion between TS and PS. These series become an elementary stream (ES) in the end to be processed. TS, PS, PES, and ES have defined standards and are in different formats from each other. A digital data stream in the TS format is received by a stream decoder in a DTV or BD system while a digital data stream in the PS format is received by a stream decoder in a digital video recorder (DVR). The received streams are classified into data (AV data), such as an audio signal (audio data), a video signal (video data), and a character signal (teletext data), a cipher, and section data of program information and the like and are transferred to an external memory through a memory controller to be stored temporarily. Among the temporarily stored data, the section data is processed by software of a CPU and the AV data is recorded into another device or is transferred from the external memory to an AV decoder (AVD) upon invocation from the AVD to start decoding the AV data.

As to details of processing in the stream decoder, a reference discloses storage means for a multiplexed digital data stream (see Patent Document 1).

Conventionally, a system LSI has been known in which a stream decoder, an AVD, and a CPU are integrated in one chip. In this system LSI, a storage memory for temporarily storing data is provided externally for each of the stream decoder and the AVD (see FIG. 1 in Patent Document 2).

As to details of processing in the AVD, another reference discloses horizontal/vertical expansion of a video signal, for example (see Patent Document 3).

While, AV data in DTV, DVD, BD, and the like are prohibited from being transferred in a decrypted form to a transfer path typified by PCI, LAN, and USB, and therefore, encoding and decoding are needed for processing of the AV data, such as recording, dubbing, and the like. Encoding and decoding necessitate a large buffer, and accordingly, a memory is provided externally in general (see Patent Document 4).

In order to utilize the bandwidth of an external memory effectively, direct memory access (DMA) transfer by large transfer units is effective. It is necessary, however, for setting a DMA transfer newly after another DMA transfer once starts to set a transfer parameter after the end of the currently performed DMA transfer. Transfer parameter setting applies a load to a CPU. If the load to the CPU is so heavy to retard the operation, the data transfer efficiency becomes worse. To tackle this problem, a method was introduced in which a DMA controller (DMAC) holds a plurality of transfer parameters so that plural DMA transfers can be switched without causing intermittence of DMA transfer (see Patent Document 5).

Patent Document 1: Japanese Unexamined Patent Application Publication 9-275381
Patent Document 2: Japanese Unexamined Patent Application Publication 2001-69106
Patent Document 3: Japanese Unexamined Patent Application Publication 11-355683
Patent Document 4: Japanese Unexamined Patent Application Publication 7-297855
Patent Document 5: Japanese Unexamined Patent Application Publication 2001-306488

DISCLOSURE OF THE INVENTION

Problems that the Invention is to Solve

Broadcasting data of DTV, which has a low transfer rate, has a high degree of urgency and whether or not the data is to be received is not known. Therefore, it is required for transferring the broadcasting data to repeat data transfer in small transfer units. On the other hand, data input from a DVD or a BD, which has a high transfer rate, is transferred in a given amount within a given period of time. Therefore, data in large transfer units must be transferred at any time.

Conventionally, in order to realize various different types of data transfers suitably, a plurality of transfer parameters are held at each input/output interface and a DMAC having a plurality of parameters for each channel is provided at each interface.

This configuration, however, increases the circuit size of the DMACs and increases software processing as well because instructions must be provided to the two DMACs at any time. Further, since there is only one interface and memory regions to be used are not necessarily arranged in order for simultaneous processing of a plurality of streams present in a bulk storage medium, such as a HDD or the like, of which capacity is increasing recently, there is no alternative but to perform read/write of the interface in time series in setting the source channel by the CPU with the use of a transfer end signal as a trigger.

In detail, conventional steps must be repeated in which data transfers of read/write attribute and a plurality of sources are performed in time series while the CPU changes sequentially the setting of a next DMAC after the end of a DMAC transfer assigned to a single transfer source and changes then the transfer parameter setting in time series. Therefore, stop and restart operations of the DMACs are involved in the CPU in switching transfers at each interface, resulting in that the data transfer performance depends largely on the performance of the CPU.

Means for Solving the Problems

In order to solve the above problems, in the present invention, a plurality of interfaces are provided which are capable of performing simultaneous data communication and each of which has a plurality of transfer sources for data transfer through the corresponding one interface. Setting registers for storing DMA transfer parameters corresponding to the transfer sources are provided, and a DMA control section performs arbitration on the basis of the values of the setting registers, stores data temporarily through the plurality of interfaces, and transfers the data to an external memory. Preferably, the setting registers include address skip region setting for the external memory.

Even in a storage device connected to a system LSI through one interface, when the CPU issues in advance a command for replaying plural data stored in the storage device and a command for recording plural data to the storage device, it looks for software of the CPU as if data transfers are performed through a plurality of interfaces.

In another aspect of the present invention, there are provided one select section for each group of the setting registers and command sections for dividing transfer parameters received from the select sections by one DMA transfer command unit and for transferring the divided ones to the DMA control section.

The DMA control section includes an internal buffer, an arbiter for arbitrating data transfer requests received from the command sections, a buffer queue for storing the data arbitrated by the arbiter for regions of the internal buffer each of which is assigned by one command issued in each command section; and a state machine for monitoring the state of the buffer queue, wherein the state machine includes sub state machines of which number is equal to the number of the regions of the internal buffer and which are equivalent to each other.

EFFECTS OF THE INVENTION

According to the present invention, unnecessary data transfer through an interface between a system LSI and an external memory can be reduced and a load to a CPU can be reduced in addition.

BRIEF DESCRIPTION OF THE DRAWINGS

FIG. 5(a) to FIG. 5(d) are conceptual diagrams showing an example of data transfer control by the state machine of FIG. 4.

EXPLANATION OF REFERENCE NUMERALS

10 storage devices of M in number
15 interfaces of M in number
20 DMA control section
21 internal buffer
30 external memory
40 setting registers of N in number
41 select section
42 command section
50 CPU
51 dedicated processor
61, 71 buffer queue
62, 72 internal buffer
63, 73 arbiter
64, 74 state machine
81 buffer queue
82 internal buffer
83, 84 arbiter
85 buffer queue judging device
86 state machine
87 internal IF queue judging device
88 request generator
89 memory IF command arbiter
90 memory IF
100 pointer controller
101 special pointer operator
102 pointer adder
103 external pointer
104 internal pointer
TS transfer sources of N in number

BEST MODE FOR CARRYING OUT THE INVENTION

An embodiment of the present invention will be described below with reference to the accompanying drawings.

Figure 1:
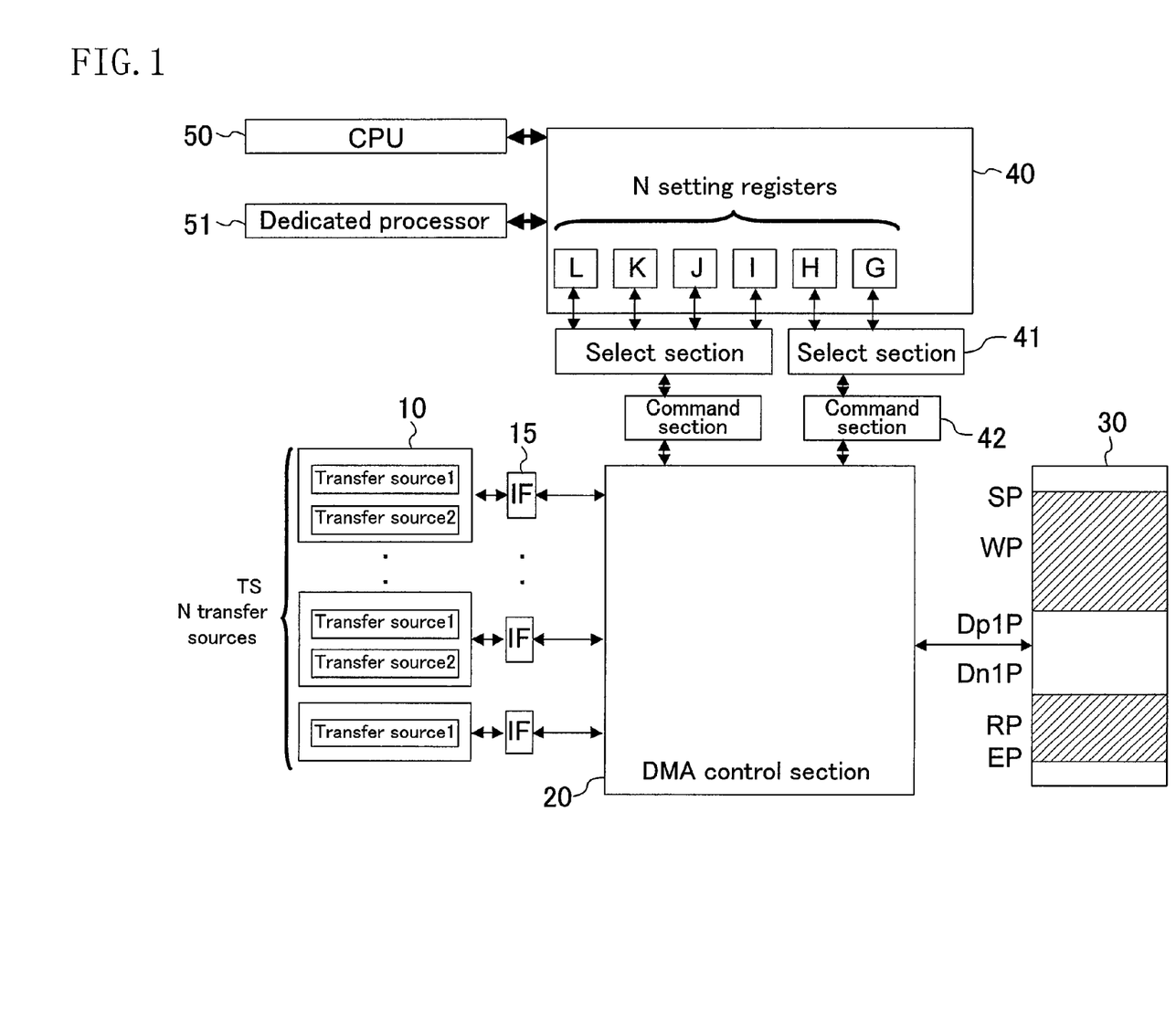
FIG. 1 is a block diagram showing a configuration example of a data transfer device in accordance with the present invention.

FIG. 1 shows a configuration example of a data transfer device in accordance with the present invention. In FIG. 1, reference numeral 10 denotes storage devices of M in number, 15 denotes interfaces (IF) of M in number, 20 denotes a DMA control section, 30 denotes an external memory, 40 denotes setting registers of N in number, 41 denotes select sections of P in number, 42 denotes command sections of S in number, 50 denotes a CPU, and 51 denotes a dedicated processor. For example, the elements except the storage devices 10 and the external memory 30 in FIG. 1 are built in one system LSI. Wherein, M, N, P, and S are integers in the ranges of $M \leq N$ and $S \leq P \leq N$.

In the data transfer device of FIG. 1, the DMA control section 20, which performs DMA transfer to and from the external memory 30 is connected to the M storage devices (of which operation frequencies may be different from each other) 10 including N transfer sources TS of which data amounts and transfer rates are different from each other through the M interfaces 15, and the DMA control section 20 receives transfer parameters from the N setting registers 40 corresponding to the N transfer sources TS to perform data transfer. The setting registers 40 are controlled by the CPU 50, which governs general data transfer control, and the dedicated processor 51, which performs dedicated processing, such as stream control or the like. In the following description, data transfer from the N transfer sources TS to the external memory 30 is called "write" while data transfer from the external memory 30 to the N transfer sources TS is called "read."

In the configuration shown in FIG. 1, the N setting registers 40 can be assigned to the N transfer sources TS in the M storage devices 10 connected through the M interfaces 15, and accordingly, transfer wait time, such as seek time of the storage devices 10 for data transfer for one transfer source TS is absorbed in the time of data transfer for another transfer source TS, so that total time required for data transfer from the plurality of storage devices 10 might be shortened. Further, the transfer parameters can be set in the setting registers 40 in advance to reduce a load to the CPU 50.

In addition, the N setting registers are grouped as follows. For example, the setting registers 40 are grouped into setting register groups in one to one correspondence with transfer source groups connected in one to one correspondence with the interfaces 15 for data transfer. The P select sections 41 for selecting the transfer parameters from the N setting registers 40 are connected to the groups of the setting registers 40, and the S command sections 42 for dividing the transfer parameters into transfer commands by one DMA transfer command unit are connected to the P select sections 41. To a setting register 40 with no select section 41 connected, a command section 42 is connected directly.

The DMA control section 20 performs DMA transfer upon acquisition of a transfer parameter from a command section 42 and rewrites the updated transfer parameter to a setting register 40 through a select section 41. Provision of the select sections 41 and the command sections 42 eliminates the need to provide an arithmetic unit for issuing a transfer command per one DMA unit, which has been conventionally necessary for each of the N setting registers 40. Hence, reduction in circuit size and in power consumption can be achieved.

Assignment of the select sections 41 and the command sections 42 may be fixed or be variable by setting from the outside.

A to-be-written region of the external memory 30 is specified by pointers in the setting registers 40, namely: a start pointer (SP) indicating a starting read/write address in each region; an end pointer (EP) indicating an ending read/write address in each region; a write pointer (WP) indicating a write address in each region; and a read pointer (RP) indicating a read address in each region. In the case where a region where no read/write is performed is provided in a region interposed between SP and EP, a pointer Dp1P indicating a starting address of the region where no read/write is performed and a pointer Dn1P indicating an ending address of the region where no read/write is performed are set.

A command section 42 receives Dp1P and Dn1P from the setting registers 40, divides a transfer command when it approaches Dp1P, and performs adjustment automatically so that the next transfer command starts from an address next to Dn1P. There may be plural regions where no read/write is performed. In this case, when each command section 42 notifies the dedicated processor 51 of the transfer end of each command divided by one DMA unit, the pointers Dp1P, Dn1P, SP, and EP for the external memory 30 about DMA transfer cause initiated by the dedicated processor 51 can be changed dynamically. These are effective in dynamically changing the data regions especially in replaying DVD, BD, and the like.

The setting registers 40 may be divided into a read only group and a write only group, and the transfer sources TS are assigned in one to one correspondence with the groups. Assignment may be changeable among the M storage devices 10. When the CPU 50 or the dedicated processor 51 is allowed to operate as a read/write switching setting section, the setting registers 40 can be used for both read and write with versatility.

Figure 2:
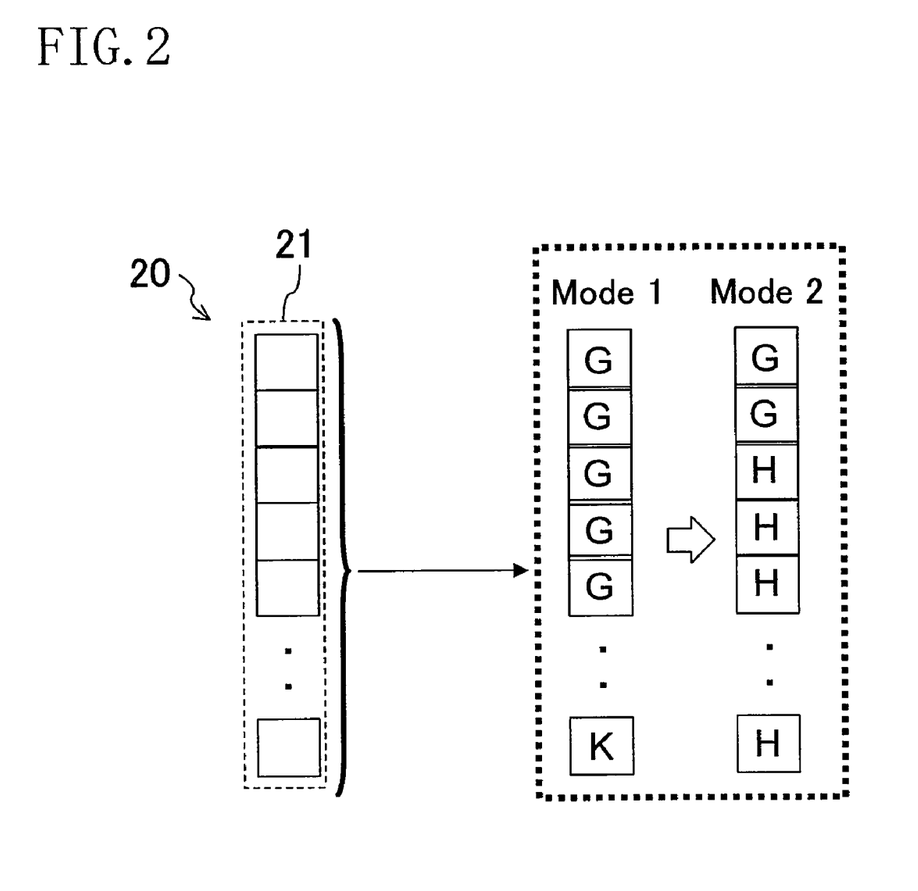
FIG. 2 is a conceptual diagram showing a use example of an internal buffer of a DMA control section in FIG. 1.

FIG. 2 shows a use example of an internal buffer of the DMA control section 20 in FIG. 1. The use of an internal buffer 21 shown in FIG. 2 is changeable according to several modes. The internal buffer 21 assigns regions as temporary buffers for DMA transfer for the N transfer sources TS. Wherein, the N transfer sources TS share all the buffer regions in a given mode so that the buffer regions are assigned in order of receipt of transfer requests. In another mode, assignment of the buffer regions to the N transfer sources TS can be fixed. The capacities of the regions may be variable according to the modes. This buffer region assignment achieves an increase in total transfer available amount of the transfer sources TS in the former mode while securing the data transfer performance of each transfer source TS as expected in advance. Provision of these modes achieves DMA control with high versatility.

Figure 3:
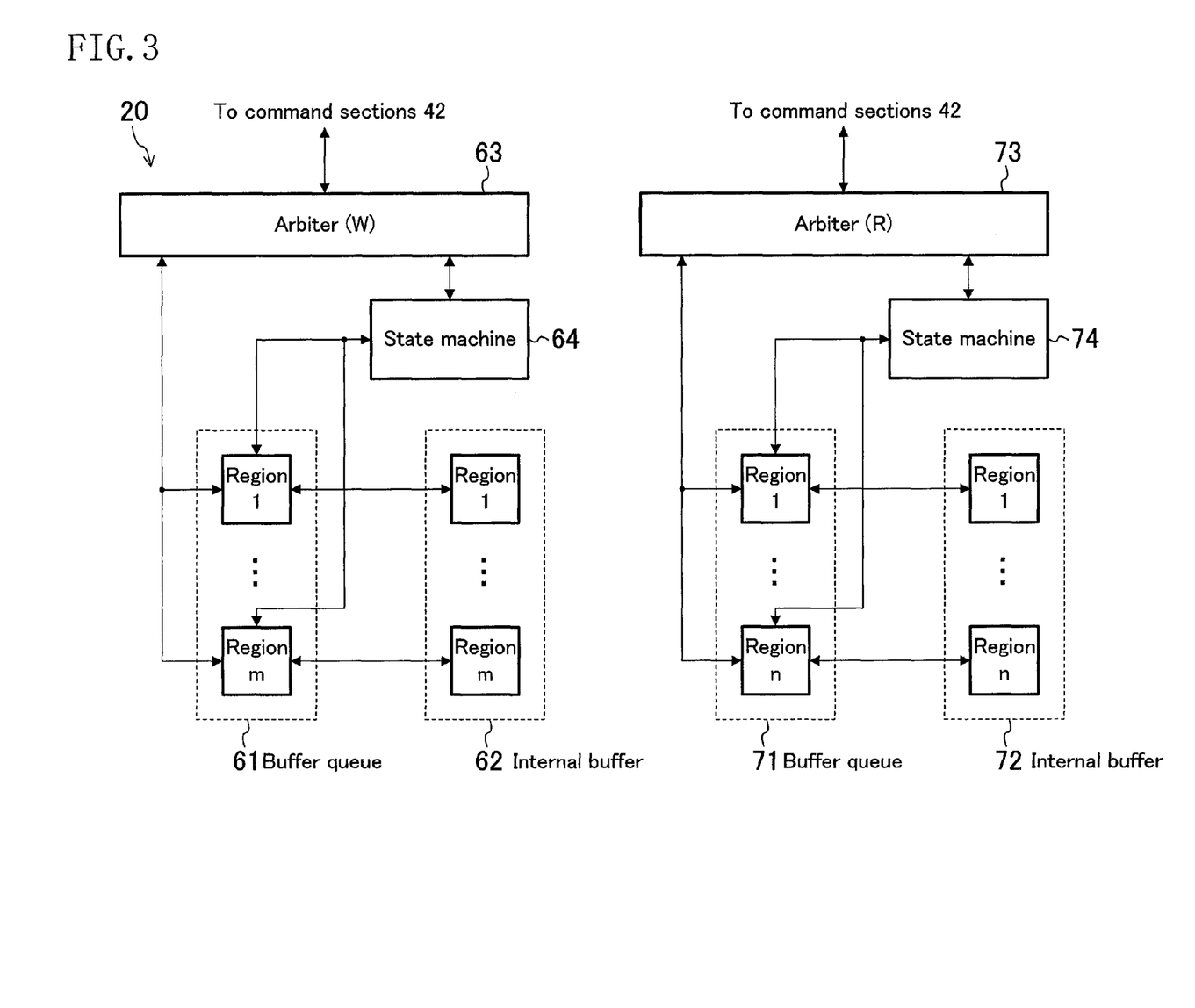
FIG. 3 is a block diagram showing a detailed configuration example of the DMA control section in FIG. 1.

FIG. 3 shows a detailed configuration example of the DMA control section 20 in FIG. 1. The DMA control section 20 in FIG. 3 includes inside thereof a write (W) DMAC and a read (R) DMAC. Each DMAC includes, in addition to an internal buffer 62, 72, an arbiter 63, 73 for arbitrating DMA transfer requests from the command sections 42; a buffer queue 61, 71 having regions in one to one correspondence with the buffer regions defined in the internal buffer 62, 72 for holding transfer commands divided by one DMA unit and received from the command sections 42 buffer region by buffer region of the defined regions; and a state machine 64, 74 for monitoring the state of the buffer queue 61, 71. Herein, the internal buffer 62 includes m buffer regions in the write DMAC, and correspondingly, the buffer queue 61 includes m queue regions. While in the read DMAC, the internal buffer 72 includes n buffer regions, and correspondingly, the buffer queue 71 includes n queue regions. Wherein, both m and n are integers.

In the present configuration, provision of the arbiters 61, 71 facilitates securing of the performance of DMA transfer of the transfer sources TS different in property from each other according to the system requests and also the storage medium. Further, the regions of the buffer queues 61, 71 are provided in correspondence with the regions of the internal buffers 62, 72 so as to hold the transfer commands, which are received from the command sections 42 and divided by one DMA unit per a buffer region. When the state machines 64, 74 manage the holding states, transfer per a buffer region can be managed. Hence, debagging efficiency can be enhanced remarkably. In addition, the buffer regions can be shared, thereby achieving highly efficient data transfer.

Figure 4:
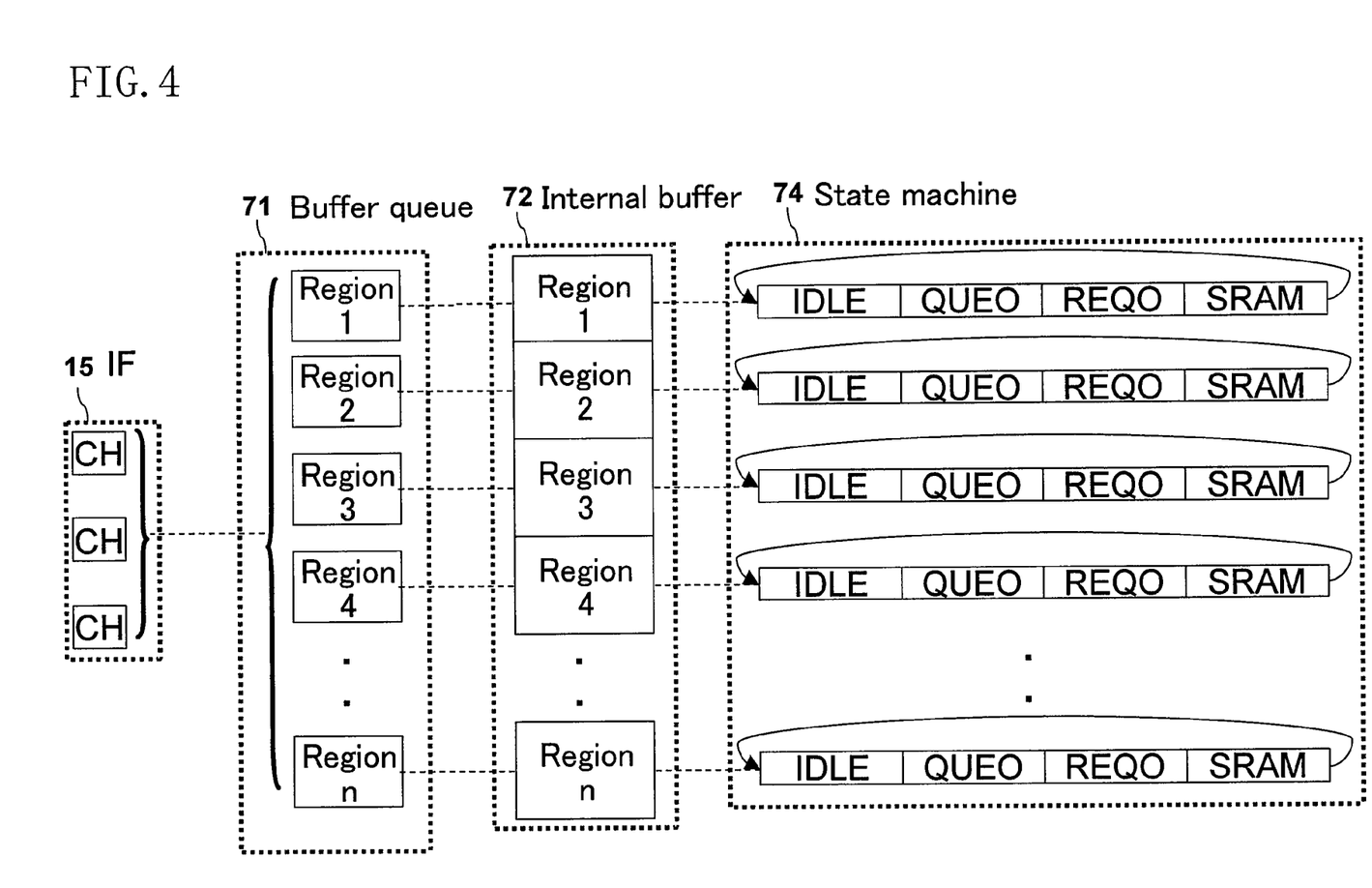
FIG. 4 is a block diagram showing a detailed configuration example of a state machine of a read DMAC in FIG. 3.

FIG. 4 shows a detailed configuration example of the state machine 74 of the read DMAC in FIG. 3. Herein, the state machine 74 includes sub state machines equivalent to each other for the respective buffer regions to control the buffer regions independently, so that transfer requests of the M interfaces 15 can share the same buffer region. In the example shown in FIG. 4, the internal buffer 72 is composed of an SRAM, and each of the n sub state machines indicates any of four states of IDLE, QUEO, REQO, and SRAM. The IDLE state is a vacant state of a corresponding SRAM region. The QUEO state is a state where a use reserved state where command receipt in a corresponding SRAM region is completed. The REQO state is a state where a data standby state after a received command is issued to the external memory 30. The SRAM state is a state where data received from the external memory 30 is present in a corresponding SRAM region and the end of data transfer to a corresponding interface 15 is waited. The number of states will be increased or decreased according to the system requests, of course.

Figure 5A:
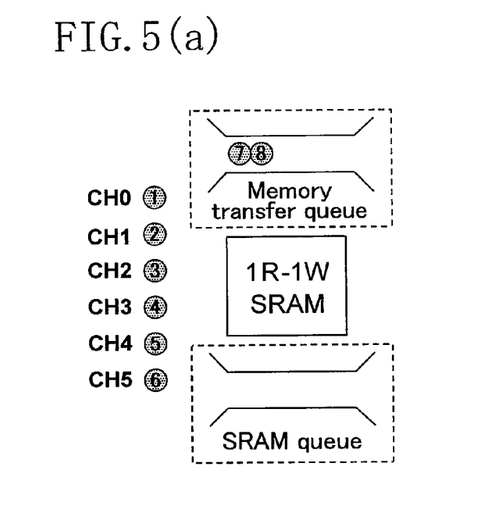
Figure 5B:
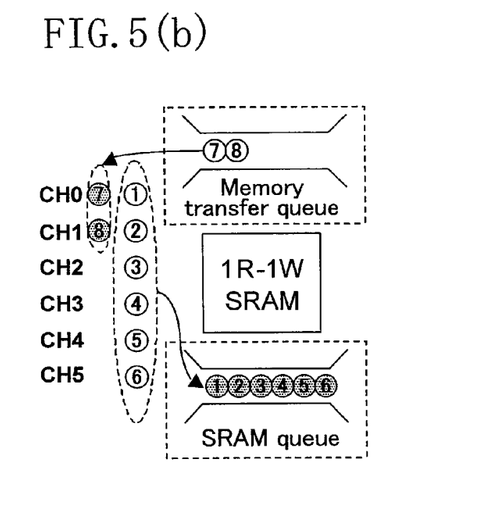
Figure 5C:
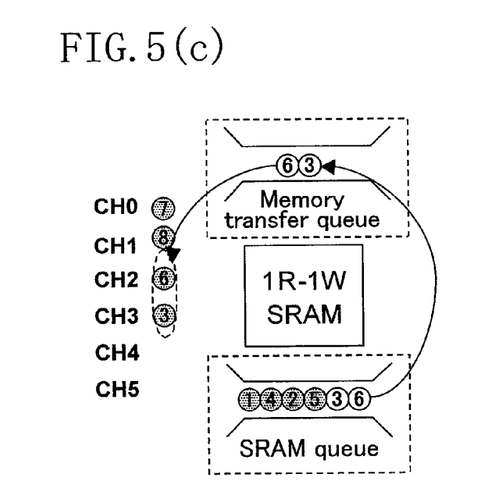
Figure 5D:
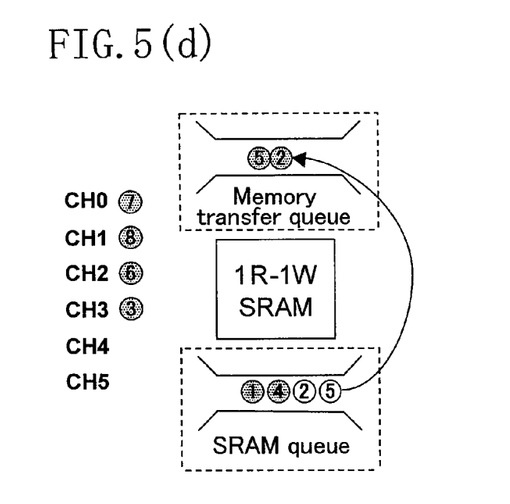

FIG. 5(a) to FIG. 5(d) show an example of data transfer control by the state machine 74 in FIG. 4. In the example, six interfaces 15 from channel 0 to channel 5 share eight SRAM regions and data transfer is performed in order of receipt of data requests. In FIG. 5(a), two regions are in the QUE0 state. In FIG. 5(b), six regions are in the SRAM state. In FIG. 5(c), two regions are in the IDLE state and are to be in the QUE0 state next. Other four regions are in the SRAM states. In FIG. 5(d), two regions are in the QUE0 state and other two regions are in the SRAM state. As described above, the SRAM regions of the internal buffer 72 are used effectively.

Though any one of the plural modes relating to the use of the internal buffer 21 is fixedly selected in FIG. 2, the state machine 74 in FIG. 4 may select the use mode of the internal buffer 72 according to the circumstances.

Figure 6:
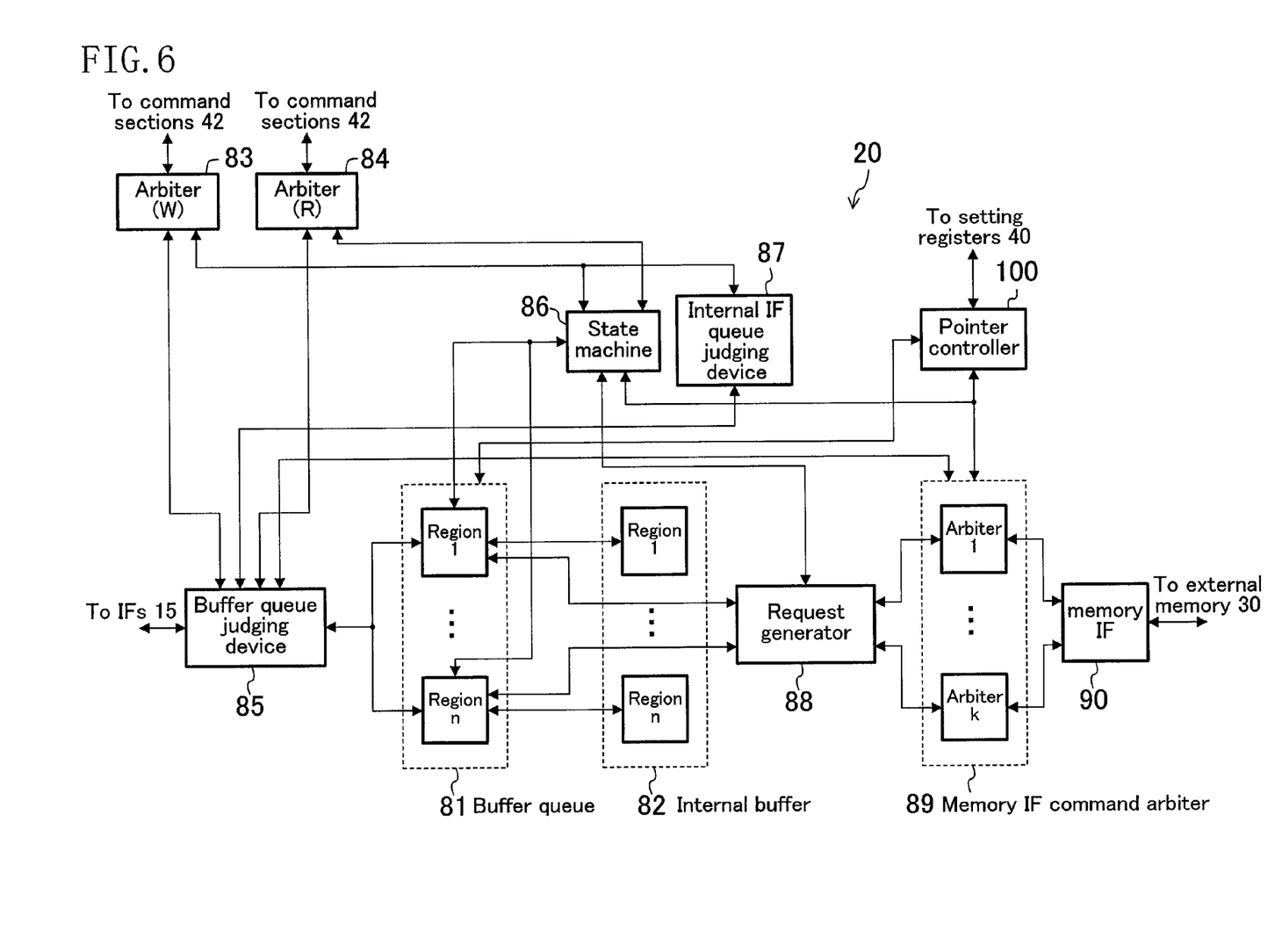
FIG. 6 is a block diagram showing another detailed configuration example of the DMA control section in FIG. 1.

FIG. 6 shows another detailed configuration example of the DMA control section 20 in FIG. 1. In FIG. 6, reference numeral 81 denotes a buffer queue, 82 denotes an internal buffer, 83 and 84 each denote an arbiter, 85 denotes a buffer queue judging device, 86 denotes a state machine, 87 denotes an internal IF queue judging device, 88 denotes a request generator, 89 denotes a memory IF command arbiter, 90 denotes a memory IF, and 100 denotes a pointer controller.

In the DMA control section 20 of FIG. 6, the arbiters 83, 84 respectively for write (W) and read (R) issue transfer commands to the buffer queue 81 through the buffer queue judging device 85. The buffer queue judging device 85 judges the transfer requests from the arbiters 83, 84 and sends the transfer commands to the buffer queue 81. With this configuration, the degree of freedom of buffer region assignment is increased in using the SRAM for the internal buffer 82. For example, provision of both a write region and a read region in one SRAM can be achieved easily. Accordingly, this is effective in reducing the circuit size of the buffer, which is inevitable for securing the data transfer performance that varies according to the system request, and in enhancing the data transfer performance.

The internal IF queue judging device 87 receives a data transfer request from the write arbiter 83 while receiving queuing state information of the transfer request in the internal buffer 82 from the state machine 86 and returns a result computed from them to the buffer queue judging device 85. The computation of the internal IF queue judging device 87 is intended to assign a write transfer command to the buffer queue 81, which is usually secured for a read transfer command, upon generation of over a predetermined number of write data transfer requests when the buffer queue 81 is in a transfer waiting state with write transfer commands filled up therein. This enhances the transfer performance at urgent write transfer.

The request generator 88 and the memory IF command arbiter 89 are provided on the assumption that the memory IF 90 is connected to a plurality of external memories 30. The request generator 88 selects an external memory 30 to receive a data transfer request (request) on the basis of the transfer command queued by the buffer queue 81 and issues the request. The memory IF command arbiter 89 is composed of k (k is an integer) arbiters for arbitrating issued requests for the corresponding external memories 30. Data transfer between the request generator 88 and the memory IF command arbiter 89 may be switched by register setting. The present configuration enables flexible data transfer to the plurality of external memories 30.

The pointer controller 100 acquires from the memory IF command arbiter 89 a transfer end signal of the data transfer command sent to the memory IF 90 or a command end signal indicating that the command is received while acquiring information on pointers of the processed command from the buffer queue 81 and rewrites the values of the pointers to the N setting registers 40.

The memory IF 90 may be externally provided for the DMA control section 20. In this case, the memory IF 90 in FIG. 6 is replaced by a circuit block governing the interface between the memory IF command arbiter 89 and the external memory IF.

Figure 7:
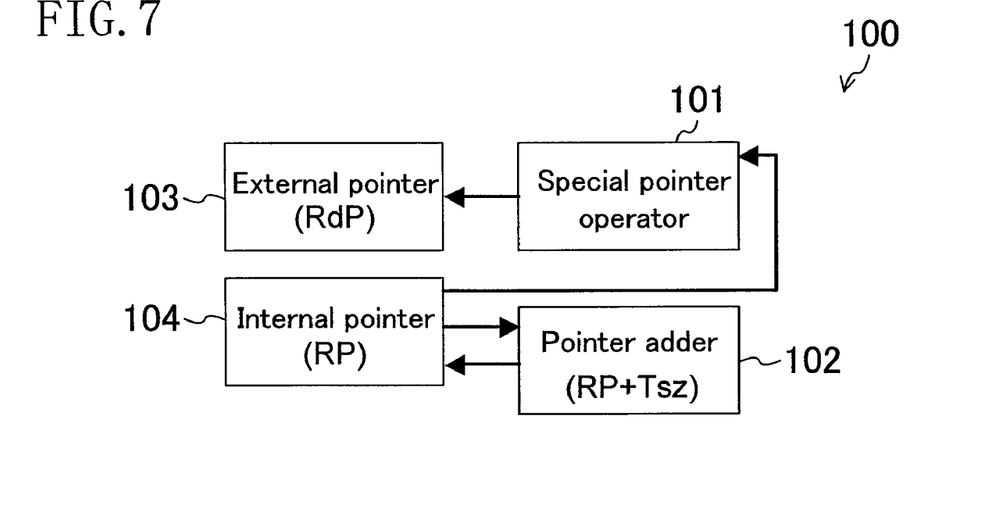
FIG. 7 is a block diagram showing a detailed configuration example of a pointer controller in FIG. 6.

FIG. 7 shows a detailed configuration example of the pointer controller 100 in FIG. 6. The pointer controller 100 includes a special pointer operator 101, a pointer adder 102, an external pointer 103, and an internal pointer 104. The special pointer operator 101 sends a result computed according to the following algorithm to the external pointer 103 upon receipt of the transfer end signal as a trigger. The pointer adder 102 returns a result of addition of RP and Tsz to the internal pointer 104 upon receipt of the transfer end signal or the command end signal as a trigger. Herein, RP represents the aforementioned read pointer and Tsz represents the size of to-be-transferred data entering in the buffer queue 81 to be sent to the memory IF 90. The internal pointer 104 and the external pointer 103 send the computed data to the N setting registers 40 upon receipt of the transfer end signal or the command end signal as a trigger. Herein, the value of WP/RP capable of being read out from the CPU 50 is WdP/RdP.

Figure 8:
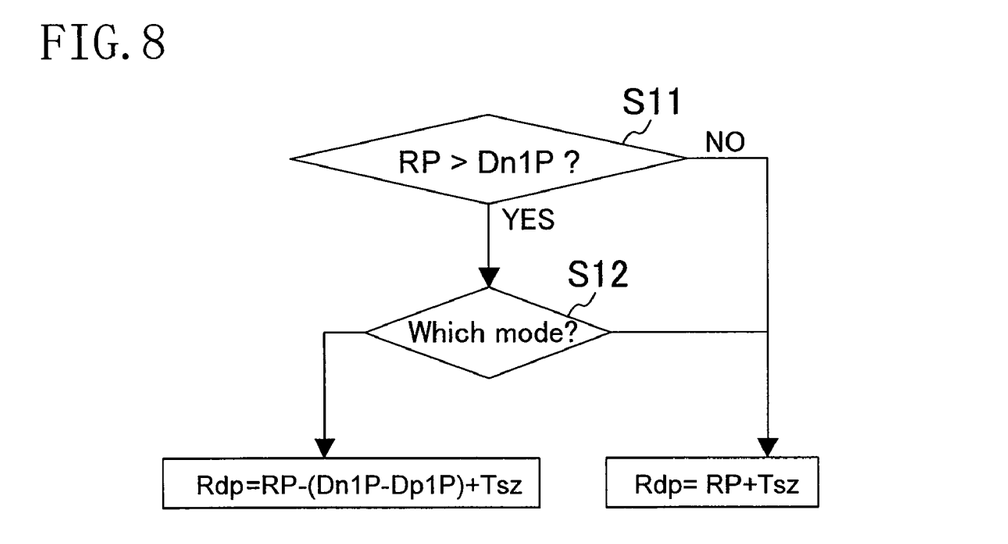
FIG. 8 is a flowchart depicting an arithmetic algorithm of the pointer controller of FIG. 7.

FIG. 8 shows an arithmetic algorithm of the pointer controller 100 of FIG. 7. In a step S11, RP and Dn1P are compared. When RP is smaller than Dn1P, a location actually read out on the external memory 30 is data to be sent to the external pointer 103. While on the other hand, when RP is larger than Dn1P, the routine proceeds to a step S12. Then, in a given mode, the location actually read out on the external memory 30 is sent to the external pointer 103. While in another mode, a value obtained by subtracting the size of a region where no read/write is performed from the location actually read out on the external memory 30 is sent to the external pointer 103. This configuration eliminates the need for software to recognize any used region of the eternal memory 30 to reduce the number of times of setting for executing a transfer start instruction, thereby enhancing the performance of the software. Though FIG. 8 shows the case with only one region where no read/write is performed, expansion of the same algorithm can address the case with two or more regions where no read/write is performed.

Figure 9:
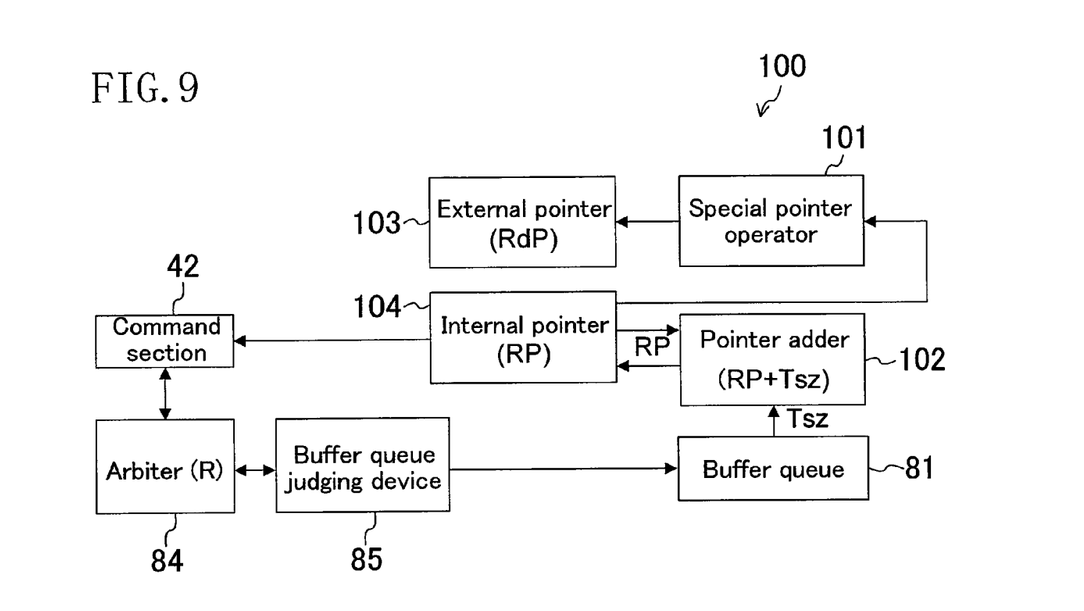
FIG. 9 is a block diagram showing a modified example of the pointer controller of FIG. 7.
Figure 10:
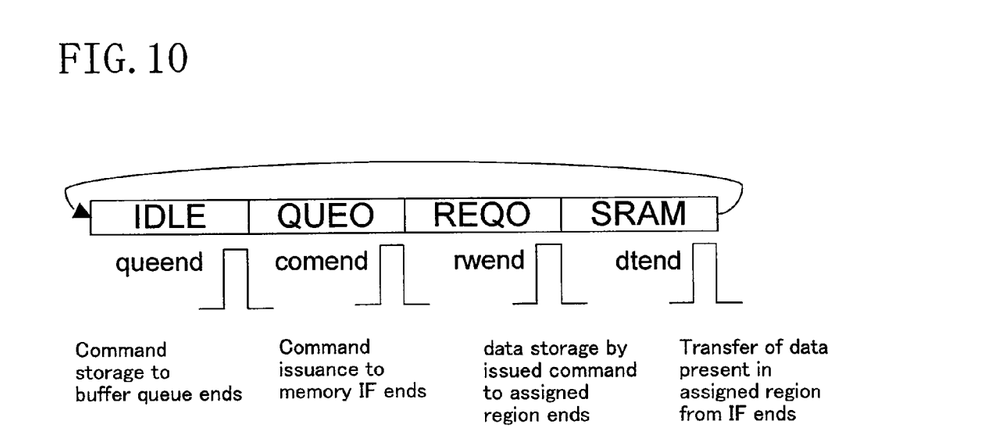
FIG. 10 is a conceptual diagram showing an operation of a state machine in a case using the pointer controller of FIG. 9.

FIG. 9 shows a modified example of the pointer controller 100 of FIG. 7, and FIG. 10 shows an operation of the state machine 86 in a case using the pointer controller 100 of FIG. 9. Herein, the internal pointer 104 further has a data holding function. Other than the time when the first transfer start instruction is received, the command sections 42 receive the next address from the internal pointer 104 rather than the N setting registers 40. Timing to update the internal pointer 104 depends on the system, and any of a command storage end signal indicating the queuing end of a command in the buffer queue 81, a command end signal, a data storage end signal indicating that the internal buffer 104 completes acquisition of data by an issued command, and a transfer end signal may be used as a trigger for updating. With the present configuration, in the case where the external pointer 103 is updated upon receipt of the transfer end signal while the internal pointer 104 is updated upon receipt of another signal as a trigger, the internal pointer 104 is updated earlier than receipt of the transfer end signal. Accordingly, the command sections 42 are operated before the actual data transfer end, thereby significantly improving the data transfer latency.

There may be provided two kinds of pointers of: a pointer updated upon the end of data transfer to the memory IF 90 in FIG. 6; and a pointer updated upon the end of data transfer from the memory IF 90 to the external memory 30, wherein both the pointers are made in correspondence with the setting registers 40 and are capable of reading data out from the CPU 50 and the dedicated processor 51. Alternatively, the end of data transfer to the memory IF 90 and the end of data transfer to the external memory 30 may be notified of the dedicated processor 51 so that the dedicated processor 51 manages updating of the pointers. Each pointer management enables advanced issuance of a data transfer command to the external memory 30, thereby enhancing the data transfer performance.

Figure 11:
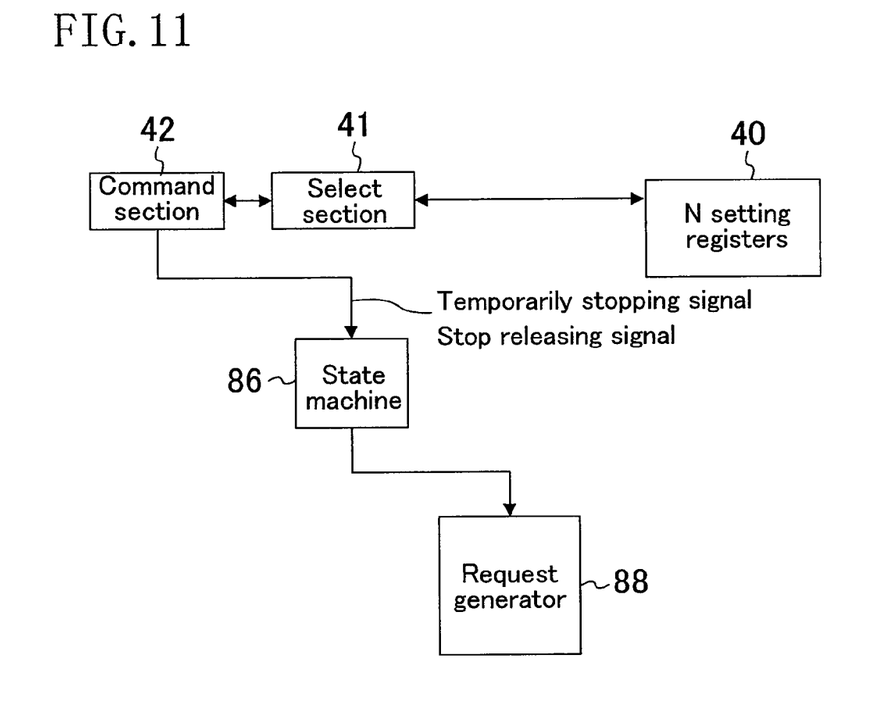
FIG. 11 is a block diagram showing a detailed configuration example of a read DMAC to which a DMA transfer temporarily stopping function and a stop releasing function are added.
Figure 12:
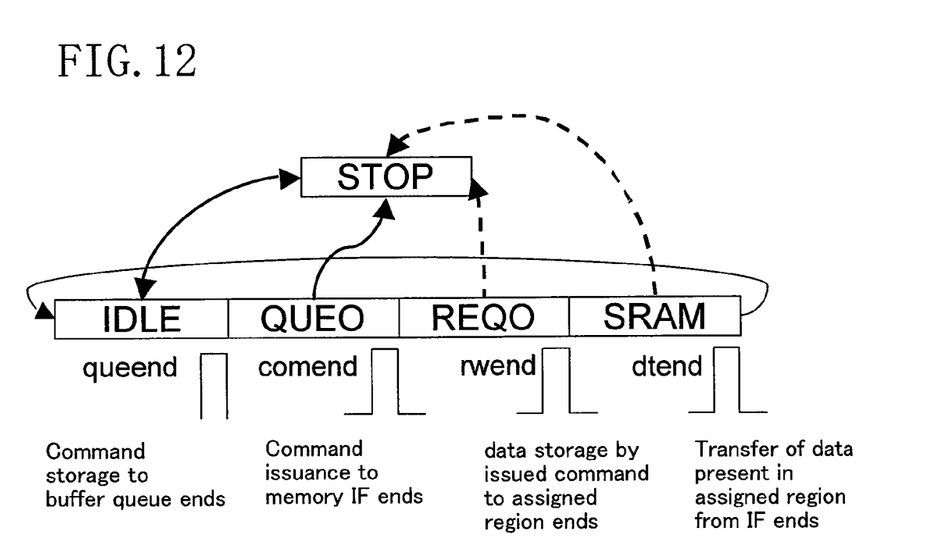
FIG. 12 is a conceptual diagram showing an operation of a state machine in FIG. 11.

FIG. 11 shows a configuration example of a read DMAC to which a DMA transfer temporarily stopping function and a stop releasing function are added, and FIG. 12 shows an operation of the state machine 86 in FIG. 11. A STOP state is added to the states of each buffer region of the state machine 86, and the state is changed through the N setting registers 40. When a buffer region thereof is in the STOP state, data transfer from a corresponding DMA source that receives an instruction is stopped temporarily. The STOP state is released when a command indicating a release instruction is received from the N setting registers 40. In the present example, the buffer region recovered from the STOP state is in the original state. In the STOP state, the request generator 88 stops generating a command to the memory IF 90. With the present configuration, the value of a pointer can be changed after temporary stop, thereby reducing wait time when a software execution request is changed.

Figure 13:
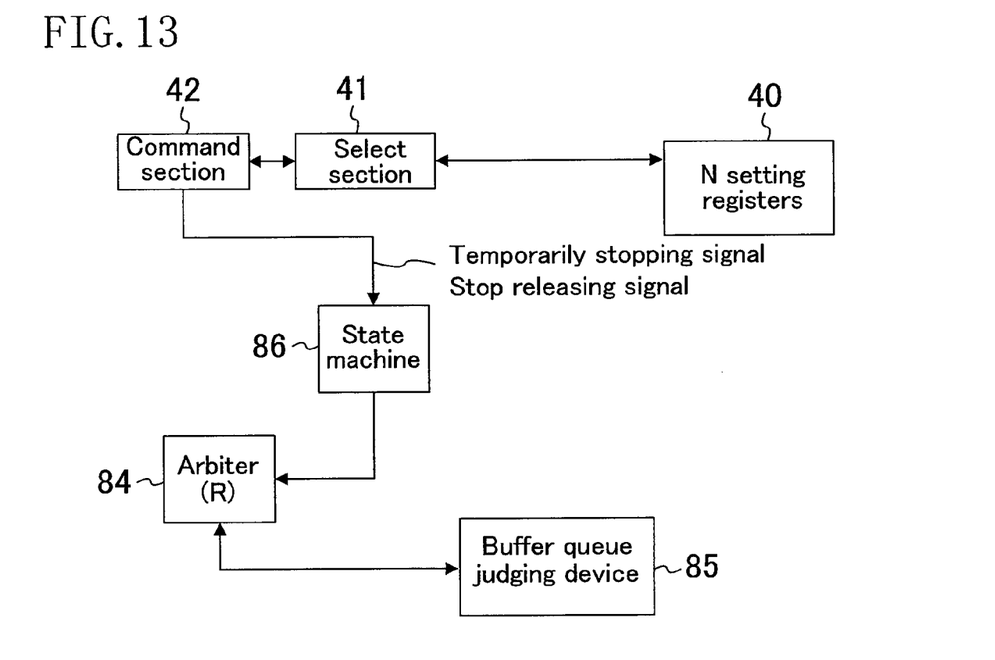
FIG. 13 is a block diagram showing a modified example of FIG. 11.
Figure 14:
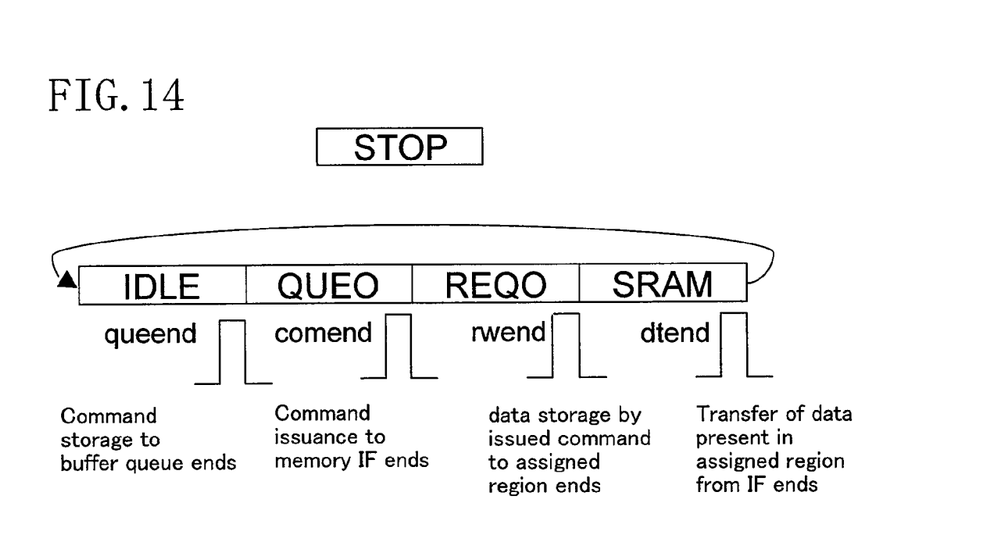
FIG. 14 is a conceptual diagram showing an operation a state machine in FIG. 13.

FIG. 13 shows a modified example of FIG. 11, and FIG. 12 shows an operation of the state machine 86 in FIG. 13. While the STOP state is provided in each buffer region in the example shown in FIG. 11 and FIG. 12, the STOP states of which number is the same as the number of the transfer source groups are provided for operation independent of the states of the buffer regions in FIG. 13 and FIG. 14. When a transfer source is in the STOP state, the arbiter 84 cuts off the transfer request to the buffer queue judging device 85 to stop DMA transfer. This releases the buffer regions more than in the example shown in FIG. 11 and FIG. 12, thereby enhancing the transfer efficiency of DMA other than the currently stopped DMA.

Stopping control in FIG. 11 to FIG. 14 may be realized by providing an automatically stopping mode in each one command or each predetermined number of plural commands with the use of a transfer end signal capable of being detected in the memory IF command arbiter 89 in FIG. 6 as a trigger.

Figure 15:
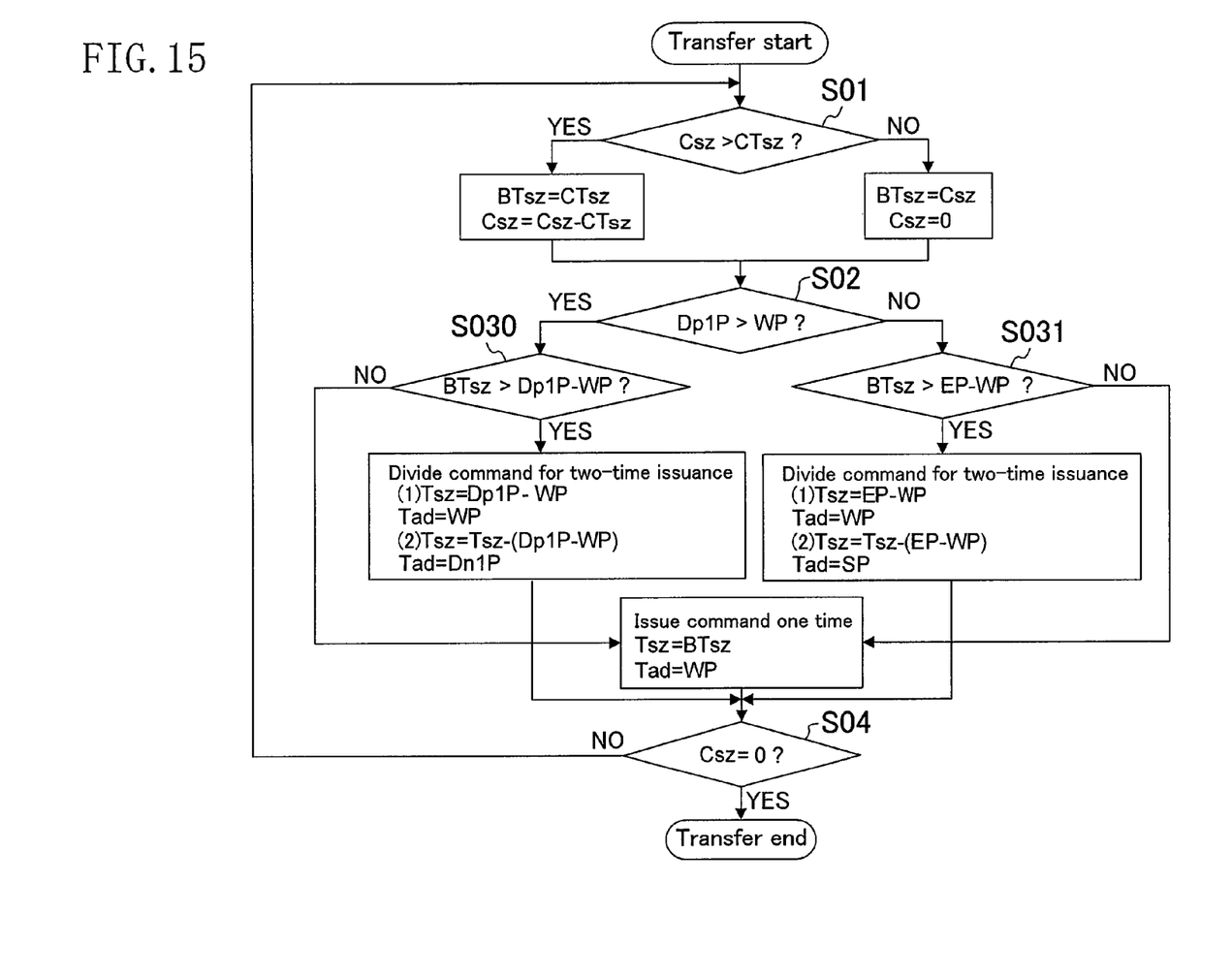
FIG. 15 is a flowchart depicting an arithmetic algorithm of a command section in FIG. 1.

FIG. 15 shows a detailed example of an arithmetic algorithm of each command section 42 in FIG. 1. Upon receipt of the pointers Dp1P, Dn1P, SP, EP, WP, RP of the external memory 30, the transfer data size Csz, and a transfer start instruction, which are set in the N setting registers 40 in FIG. 1, each command section 42 continues issuing a data transfer size Tsz and a data transfer start address Tad as a command, which are stored in the buffer queue 81 and are to be sent to the memory IF 90, in accordance with the following algorithm. It is noted that while only WP is exemplified in FIG. 15, the same control is applied to RP.

First in a step S01, it is judged whether Csz is smaller or lager than a reference data size CTsz as a transfer unit into which Cxz is divided by one DMA unit. When it is larger, CTsz is selected and CTsz is subtracted from Csz. When it is smaller, Csz is selected to be set at zero. Next in a step S02, it is judged whether WP is smaller or larger than Dp1P. Further judgment is performed in a step S030 when it is smaller or in a step S031 when it is larger. In the step S030, it is judged whether the data size BTsz selected in the step S01 is smaller or larger than Dp1P-WP. When it is larger, the command is divided so as to be issued twice as follows: (1) Tsz: Dp1P-WP and Tad: WP; and (2) Tsz: a value obtained by subtracting Tsz that has been issued in (1) from the data size BTsz selected in the step S01 and Tad: Dn1P. While when it is smaller, the command is: Tsz: the data size BTsz selected in the step S01 and Tad: WP. In the step S031, it is judged whether the data size BTsz selected in the step S01 is larger or smaller than EP-WP. When it is larger, the command is divided so as to be issued twice as follows: (1) Tsz:EP-WP and Tad: WP; and (2) Tsz: a value obtained by subtracting Tsz that has been issued in (1) from the data size BTsz selected in the step S01 and Tad: SP. When it is smaller, the command is: Tsz: the data size BTsz selected in the step S01 and Tad: WP. Finally in a step S04, it is judged whether or not Csz remains. When it does not remain, the data transfer ends. When it remains otherwise, the steps S01 to S04 are repeated. With the above arrangement, various plural transfer sources and commands of a transfer amount of DMA request master can be divided into quite the same DMA commands, and accordingly, data transfer using the same DMA control section 20 is enabled for any kinds of transfers.

INDUSTRIAL APPLICABILITY

As described heretofore, the present invention is useful for data transfer to an external memory in DTV receiving devices, DVD or DB recording/replaying devices, and the like.

The invention claimed is:

1. A data transfer device, comprising, where M and N are integers in a range of M≦N:
    M storage devices including N transfer sources of which storage regions are different from each other,
    M interfaces connected to the storage devices;
    N setting registers for the transfer sources for storing DMA transfer settings of the transfer sources; and
    a DMA control section for performing DMA transfer control on the basis of set values of the N setting registers,
    wherein the DMA control section includes an internal buffer as temporary data storage regions,
    the internal buffer has a plurality of modes for assignment of the transfer sources, and
    all regions of the internal buffer are shared by subsequently assigning transfer requests from all the transfer sources to vacant regions of the internal buffer in a given mode while a fixed region is assigned to each transfer source in another mode.

2. The data transfer device of claim 1, further comprising, where P and S are integers in a range of S≦P≦N:
    P select sections provided for each group of the N setting registers; and
    S command sections for dividing transfer parameters received from the P select sections by one DMA transfer command unit,
    wherein the P select sections send the transfer parameters that the respective groups of the N setting registers receive to the DMA control section through the S command sections.

3. The data transfer device of claim 2, wherein the DMA control section further includes:
    an arbiter for arbitrating data transfer requests received from the command sections;

a buffer queue for storing data arbitrated by the arbiter for regions of the internal buffer each of which is assigned by one command issued in each command section; and a state machine for monitoring a state of the buffer queue.

4. The data transfer device of claim 3, wherein the state machine monitors a state of the arbiter in addition.

5. The data transfer device of claim 3, wherein each of the buffer queue and the state machine includes read one and write one.

6. The data transfer device of claim 3, wherein the state machine includes sub state machines of which number is equal to the number of the regions of the internal buffer and which are equivalent to each other.

7. The data transfer device of claim 3, wherein the state machine further has a function of selecting a use mode of the internal buffer.

8. The data transfer device of claim 3,
wherein the DMA control section further includes a buffer queue judging device for judging, from arbitration results of the arbiter for read and write and the state of the internal buffer, which assignment of read and write to the internal buffer is selected, and
the internal buffer is shared for read and write.

9. The data transfer device of claim 8,
wherein the DMA control section further includes an internal IF queue judging device for judging, from the state machine, which assignment of read and write to the internal buffer has a higher degree of urgency, and
a read internal buffer is capable of being assigned to a write internal buffer in urgency.

10. The data transfer device of claim 3,
wherein the DMA control section further includes, so that a plurality of external memories are connectable to the DMA control section, a memory IF command arbiter corresponding the plurality of external memories, a memory IF intervening between the plurality of external memories and the memory IF command arbiter, and a request generator,
the request generator issues a plurality of commands to the memory IF command arbiter with the use of a value held in the buffer queue on the basis of the state of the state machine, and
the memory IF command arbiter arbitrates the plurality of commands to issue a command to the memory IF.

11. The data transfer device of claim 1, wherein the N setting registers are accessible from a plurality of processors.

12. The data transfer device of claim 1,
wherein the N setting registers includes a pointer indicating a starting address of a region where no read/write is performed out of use regions of an external memory connected to the DMA control section and a pointer indicating an ending address of the region where no read/write is performed, and
a region between the pointers is skipped in accessing the external memory.

13. The data transfer device of claim 12, wherein a difference between the starting address and the ending address of the region where no read/write is performed is computed automatically to indicate an address from which the difference is subtracted as an ending address of a read or write region of the external memory in a given mode while the ending address of the read or write region of the external memory is indicated without change in another mode.

14. The data transfer device of claim 13, further comprising:
a register readable from a CPU for holding the difference.

15. The data transfer device of claim 1,
wherein the DMA control section further includes a memory IF governing an interface between the data transfer device and an external memory, and
a pointer updated at an end of data transfer to the memory IF and a pointer updated at an end of data transfer to the external memory are provided in the N setting registers.

16. A data transfer method between an external memory and M storage devices including N transfer sources of which storage regions are different from each other, where M and N are integers in a range of $M \leq N$, comprising the steps of:
storing DMA transfer settings of the transfer sources for the transfer sources to N setting registers; and
allowing a DMA control section to perform DMA transfer control on the basis of set values of the N setting registers, wherein
the DMA control section includes an internal buffer as temporary data storage regions,
the internal buffer has a plurality of modes for assignment of the transfer sources, and
all regions of the internal buffer are shared by subsequently assigning transfer requests from all the transfer sources to vacant regions of the internal buffer in a given mode while a fixed region is assigned to each transfer source in another mode.

17. The data transfer method of claim 16, further comprising the step of:
allowing S command sections to divide by one DMA transfer command unit transfer parameters received from P select sections provided for respective groups of the N setting registers, where P and S are integers in a range of $S \leq P \leq N$,
wherein the P select sections send to the DMA control section through the S command sections the transfer parameters received from the groups of the N setting registers.

18. The data transfer method of claim 17, further comprising the steps of:
detecting a transfer end signal of each command in one DMA transfer command unit issued by the S command sections; and
changing a memory region indicating pointer included in the N setting registers.

19. The data transfer method of claim 18, further comprising the step of:
informing a temporary stopping instruction of a DMA transfer command in the DMA control section through the N setting registers before the step of changing the memory region indicating pointer.

20. The data transfer method of claim 16, further comprising the steps of:
recognizing an end of data transfer from a single transfer source to a memory IF governing an interface with the external memory;
storing a write pointer indicating how much data is written in the external memory into a pointer updating temporary region at an end of data transfer to the memory IF;
issuing a next data transfer request for the single transfer source to the N setting registers;
recognizing an end of transfer of data, of which transfer to the memory IF ends, to the external memory; and
storing a value stored in the pointer updating temporary region into the write pointer.

* * * * *